Sept. 20, 1938.  F. SMITH  2,130,567
PARACHUTE APPARATUS
Filed March 6, 1935  2 Sheets-Sheet 1
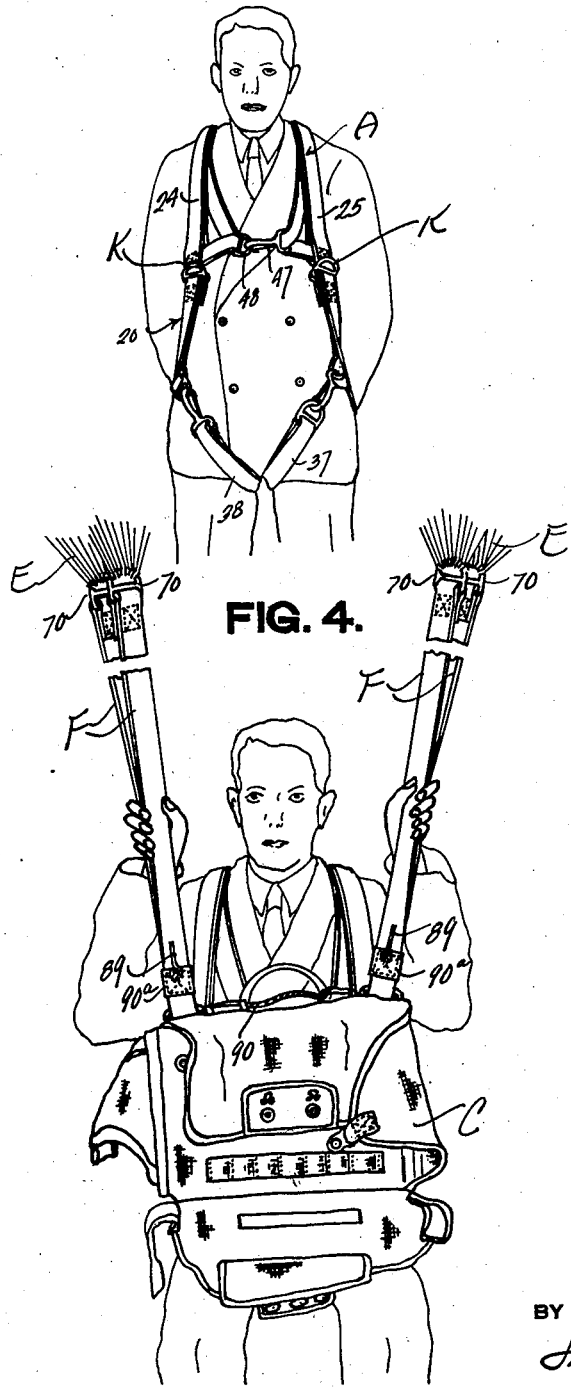
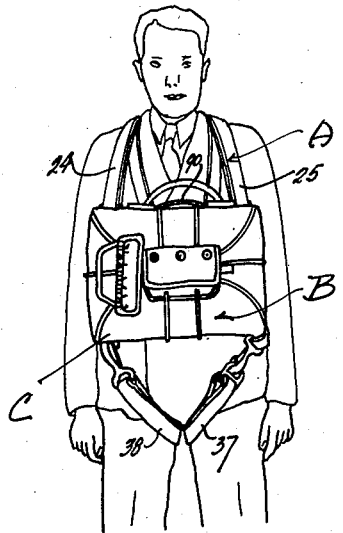
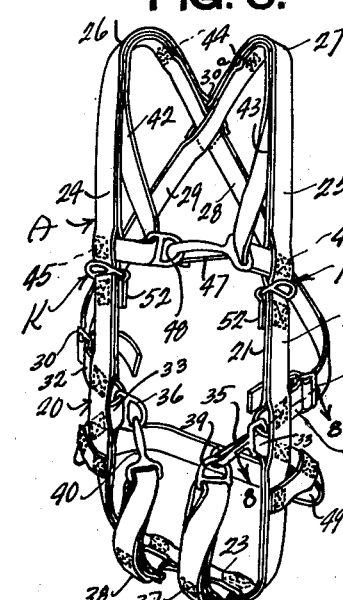
INVENTOR,
Floyd Smith Sept. 20, 1938.  F. SMITH  2,130,567
PARACHUTE APPARATUS
Filed March 6, 1935   2 Sheets-Sheet 2
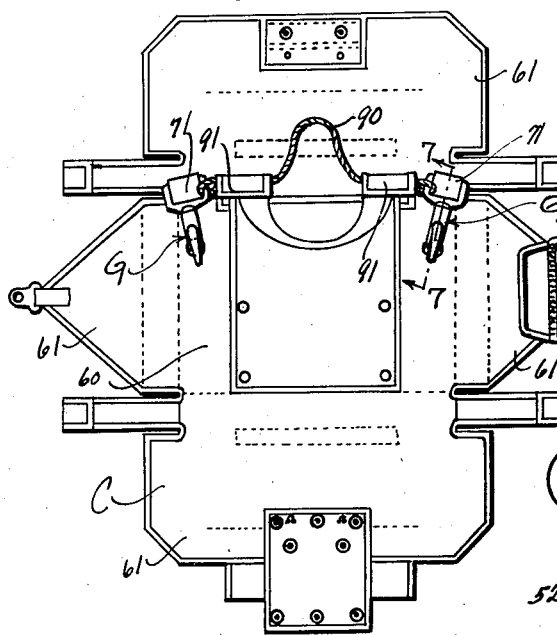
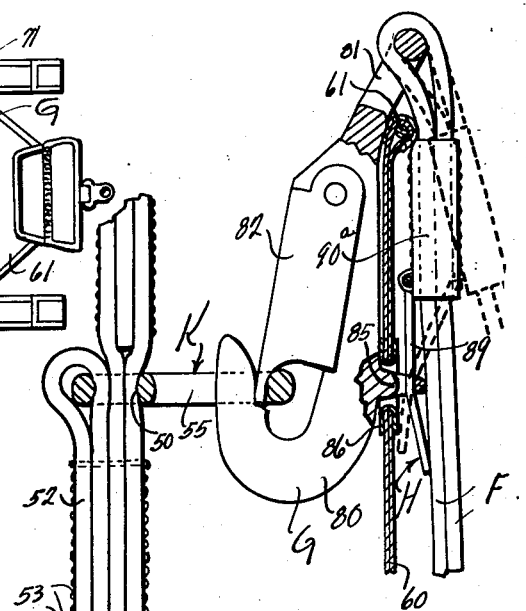
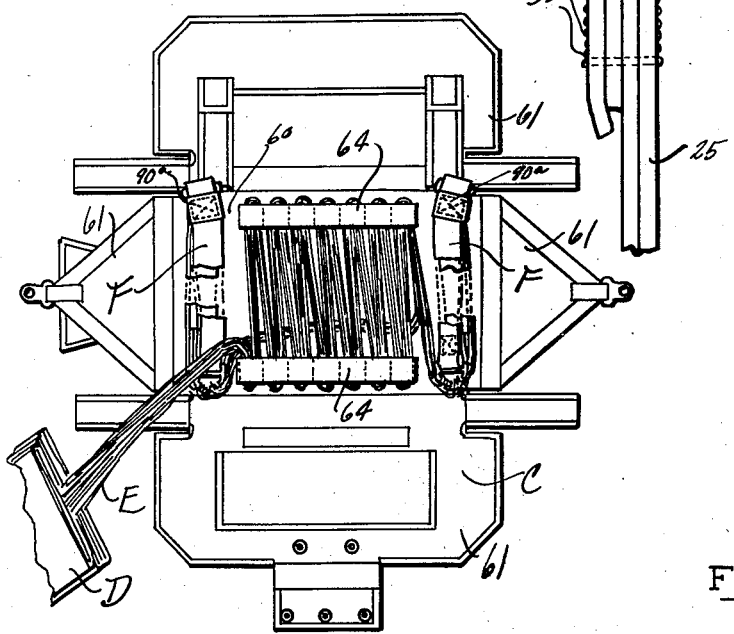
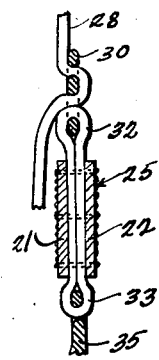
INVENTOR.
Floyd Smith Patented Sept. 20, 1938

2,130,567

UNITED STATES PATENT OFFICE 2,130,567

PARACHUTE APPARATUS

Floyd Smith, Buffalo, N. Y., assignor to Irving Air Chute Company, Inc., Buffalo, N. Y., a corporation Application March 6, 1935, Serial No. 9,670

15 Claims. (Cl. 244—148)

This invention relates to improvements in parachute apparatus.

The primary object of this invention is the provision of an improved harness and parachute pack therefor; the parachute pack being of the emergency type and readily attachable and detachable with respect to the harness.

A further object of this invention is the provision of an improved quick connector pack and harness for aviators embodying means for the emergency attachment of the pack at the front of the wearer under such circumstances that the container remains at such location upon opening of the pack.

A further object of this invention is the provision of an improved emergency attachable parachute pack and harness in which the pack may be so connected to the harness that the harness release coupling parts may be readily released when landing in order to permit the rider to slide out and free himself with facility from the parachute and harness when landing in water or high wind.

A further object of this invention is the provision of emergency attachable pack parachute apparatus, such as shown in the U. S. Hamer Patent #1,958,000, but embodying an improvement thereover in the elimination of movement of the container past the face of the wearer upon release of the parachute canopy.

Other objects of the invention embody, in parachute apparatus of the above nature, provision for the ready handling and guiding of the parachute during a descent; the safe operation of the parachute in event only one coupling part of the pack is attached to one coupling of the harness; elimination of the danger of metal parts of the pack or harness hitting or contacting the head of the wearer during a parachute descent; the elimination of loading shocks upon the back of the wearer, and the provision of a parachute harness which is lighter in weight, simpler in adjustment and use, more comfortable, easier riding during a parachute descent, and one which may be worn loose and yet safely.

Other objects and advantages of the invention will be apparent during the course of the following detailed description.

In the accompanying drawings, forming a part of this specification, and wherein similar reference characters designate corresponding parts throughout the several views, Figure 1 is a front view of an individual wearing the improved emergency pack and harness.

Figure 2 is a front view of the individual with the pack removed, showing the relative fit of the harness upon the wearer.

Figure 3 is a perspective view of the harness with the fittings thereof coupled together.

Figure 4 is a front view of the wearer riding the parachute, as during a descent, showing the opened container at the front of the wearer and the relation of the suspension webs to the body of the wearer, during the descent.

Figure 5 is a rear view of the open container showing the relation of the pack coupling parts in their releasably fastened relation upon the container.

Figure 6 is a view of the open container at the reverse side from that illustrated in Figure 5, showing the associated details of the container, shroud lines, suspension webs; the canopy not being shown in packed relation.

Figure 7 is an enlarged fragmentary sectional view taken substantially on the line 7—7 of Figure 5, and showing more particularly the improved means for releasably retaining a riser web coupling upon the container in a fixed relation so that the said coupling part of the pack may properly cooperate in attachment with a coupling part of the harness, for emergency purposes, as has been more particularly set forth in U. S. Patent #1,958,000. This view also shows the associated connection of the harness and pack coupling parts.

Figure 8 is a cross sectional view taken substantially on the line 8—8 of Figure 3, and more particularly showing the harness adjustment.

In the drawings, wherein for the purpose of illustration is shown only a preferred embodiment of the invention, the letter A may generally designate the improved harness, with which the improved pack B may be detachably associated. The pack B is of the general nature set forth in U. S. Patent #1,554,192, and may include a container C of somewhat conventional construction for releasably housing a parachute canopy D. Conventional shroud lines E are associated with the canopy D, terminating in any desired number of supporting or suspension webs F. These suspension webs F at each side of the pack terminate in coupling parts G releasably associated by means H in fixed relation upon the outer side of the container for mutual releasable attachment with complementary coupling parts K associated with the harness A in a relation to be subsequently described.

The improved parachute harness A may be constructed of any desired webbing. It generally partakes of the characteristic of the Ball harness set forth in U. S. Patent #1,560,366, although it may be of the single-point release type such as shown in U. S. Patents #1,899,656 or #1,842,611, as modified according to the harness shown in U. S. application Serial No. 717,858, filed March 28, 1934. In the main it comprises a body supporting sling 20 consisting of a double thickness of webbing 21 and 22 stitched together to provide a seat portion 23 upon which the wearer sits during a parachute descent. Side riser portions 24 and 25 complete the major part of the sling. In the present harness, since the suspension webs are not directly connected as a part of the harness, the riser webs 24 and 25 continue to provide shoulder straps 26 and 27 respectively which cross over at the back of the wearer respectively providing back straps 28 and 29 which are slidably associated in loosely connected relation at 30ª, as is conventional practice with the back straps of some modern types of harnesses. These back straps 28 and 29 continue downwardly across the back around the sides of the wearer adjacent to the waist, where they are adjustably connected with suitable coupling fittings 30, more particularly shown in Figures 3 and 8 of the drawings. Each riser web 24 and 25, above the seat strip 23, is provided with a doubled strap sewn between the portions comprising the respective riser strap or web to provide a rearwardly facing loop 32 permanently supporting the adjusting buckle or fitting 30 to which the back strap is adjustably connected; the latter being forced through the opening of the buckle in order to hold the adjustment, as shown in Figure 8. These straps sewn between the layers of the riser webs 24 and 25 each also provide a loop 33. These loops 33 permanently support leg strap couplings 35 and 36.

The seat strap 23 of the harness is provided with usual adjustable leg straps 37 and 38 having coupling fittings 39 and 40 at the free ends thereof for respective complementary association with the couplings 35 and 36, in order to provide leg openings with the sling, in accordance with the teaching of the Ball Patent #1,560,366.

Suitable means is provided to releasably retain the upper part of the harness upon the body of the wearer, comprising auxiliary breast and shoulder straps 42 and 43 respectively stitched at 44 to the shoulder-back straps 26—28 and 27—29, and continuing over the shoulders and the front of the harness where they are respectively stitched at 45 to the riser webs 24 and 25 of the sling of the harness. These loops, in the nature of breast straps, have complementary coupling parts 47 and 48 thereon for releasable connection across the breast of the wearer.

It is a notable feature of the harness, as thus described, that there are no suspension lines permanently connected to the harness. The harness in the form above described is adapted to encase and fit about the body of the wearer in a comfortable and adjustably safe relation.

The straps which form the loops 33 are continued rearwardly of the harness, above the seat 23, to provide a crossing back strap 49, which prevents the wearer from falling rearwardly down through the harness during a parachute descent.

An improved feature of the harness is the provision of the fixed coupling part K upon the riser webs 24 and 25 at or above the waist of the wearer, preferably at or close to the center of gravity of the wearer, or in any desired position along the riser webs. These couplings K are preferably metal fittings. They provide a loop opening 50, shown in Figure 7, through which the double layered web of the risers 24 and 25 are disposed. An additional reinforcing loop 52 is permanently secured, as by stitching 53, to the rear of each riser web, and also looped through the opening 50. The portions of the riser webs and reinforcing loops 52 threaded thru each of the openings 50, are squeezed and compressed tightly in the openings 50 to rigidly and fixedly position the coupling parts K in non-wobbling on the riser webs with its front coupling loop portion 55 in outstanding relation normal to the respective riser 24 or 25, as the case may be. These coupling eyes or loops are thus permanently and fixedly connected to the harness in an outstanding definitely spaced relation for cooperative complementary connection with the pack.

If desired the usual back pad may be used with the back straps.

Referring to the pack B, the container C thereof includes the usual back or body wall 60, which may be appropriately reinforced in a semi-rigid relation by means of a wire frame 61, in accordance with the teachings of the prior art. The back wall 60 may be provided with the usual closure flaps 61, or the container may have a separate closure as part thereof. The shape and arrangment of the container is unimportant except insofar as the retention of the coupling parts thereon is concerned. The container may include the usual pockets 64 for receiving the shroud lines E of the parachute in a releasable zig-zag stowed relation, as set forth in U. S. Patent #1,554,192. The flaps of the container, as shown in the drawings, are brought together over the packed parachute canopy and shroud lines and releasably held together by means of the conventional rip cord arrangement such as set forth in U. S. Patent #1,462,456.

The shroud lines are bunched together in four bunches and as such connected with coupling D-rings 70. The D-rings 70 are disposed at the ends of the suspension straps or webs F; the arrangement being such that two suspension webs are adapted to be disposed at each side of the wearer during a parachute descent. Thus, each pair of suspension webs F is provided at their ends opposite the D-rings 70 with a coupling member G complementary to the coupling member K. This coupling member G is in the nature of a snap fastener, including a hook portion 80 having an apertured eye 81 at the end thereof thru which the pair of suspension webs F are connected. The snap fastener may include the usual detent 82 of well known construction.

The suspension webs are disposed inside of the container in such relation that only the coupling parts G extend exteriorly at opposite top corners of the pack and there they are held by the improved means H, in a fixed readily attachable relation with respect to the complementary coupling parts K of the harness. The means H includes an apertured stud 85 on the back of the hook portion 80 of each of the coupling parts G adapted to extend through a grommet or washer 86, disposed upon the back wall 60 of the pack and opening into the container. Each pair of suspension webs F adjacent to their connection with the respective coupling part G, is provided with a wire pin or retaining member 89 affixed as at 90ª to the suspension webs. It may be flexible or semi-flexible and it is adapted to extend through the eye of the stud 85 in order to releasably lock the coupling part G on the outer side of the wall 60 at the corner of the pack, as shown in Figures 5 and 7 of the drawings in position for complementary attachment to the coupling part K. It is noted that the length of the suspension webs between the rip pin 89 and the eye 81, to which the webs are attached, is such that the coupling part G is applied rather tightly against the wire frame 61 and held against swivelling or turning until the pin 89 is released from the stud 85.

As will be noted from Figure 5 the coupling parts G are thus held in definitely spaced and faced non-wobbling relation complementary to the spacing and facing of the coupling parts K of the harness A. This spacing of the coupling parts G with respect to the spacing of the coupling parts K is identical when the harness is upon the wearer, so that the pack B may be taken by the wearer and merely a push of the detents 82 of the couplings G against the coupling parts K is necessary in order to couple the complementary parts G and K, as is quite apparent.

As a safeguard to insure a distribution of the load upon all of the suspension webs and shroud lines in event it is possible during an emergency attachment of the pack upon the harness to only couple one of the parts G with one of the parts K, I provide a wire cable connection 90, shown in various views of the drawings, particularly in Figure 5, having the ends thereof securely affixed in the eye portions 81 of the two coupling parts G. This wire cable connection may also furnish the means of attaching the container C thereto, by means of fabric loops 91, as shown in Figure 5 of the drawings. The cable 90 is rather loose as positioned upon the container when the coupling parts G are affixed therewith, as shown in Figure 5, and this enables the container to hang loosely on the cable 90 during a parachute descent, so that the container may be slid to one side in order not to interfere with release actuation of parts of the harness or to interfere with the vision of the parachutist.

It can readily be understood from the position of the parts shown in Figure 4 that during a parachute descent the container remains at the front of the wearer and does not fly up past his or her face. The parachute canopy emerges from the pack in normal manner and due to drag thereon the rip pins 89 are pulled from the studs 85 and this of course releases the connecting couplings G from the container. Due to the fact that the container C remains at the front of the wearer connected only to the spreader or connecting wire cable 90 the riser webs F are spread in divergent relation up above the head of the wearer so as to facilitate release of the harness coupling parts when approaching a landing in order that the rider may readily release himself or herself from the harness, as is sometimes necessary when landing in water or in a high wind. With this arrangement the wearer may guide the parachute and handle it with facility during a parachute descent, through the suspension webs F.

The improved harness of the present invention may be used with either a back pack or a seat pack. Thus it is possible to use it with the back pack shown in the Smith Patent #1,462,456, or with the back pack shown in copending application Serial No. 566, filed January 5, 1935.

Various changes in the shape, size, and arrangement of parts may be made to the form of invention herein shown and described, without departing from the spirit of the invention or the scope of the claims.

I claim:

1. In parachute apparatus the combination of a container, a parachute canopy, suspension means connected with the canopy, a coupling part connected with the suspension means, the container having a grommet therein opening into and exteriorly of the pack, the coupling part having a rigid apertured stud thereon for extension thru the grommet from exteriorly of the pack, and a releasable connecting member connected with the suspension means for releasable extension through the eye of the stud within the container in order to fix and definitely face the coupling part upon the pack for facile attachment to a wearer, the said member adapted when the suspension means is pulled taut to release from the stud and release the connection of the coupling part from said container.

2. In an emergency parachute pack the combination of a container, a parachute canopy, shroud lines connected with the canopy, suspension webs connected with the shroud lines, coupling parts connected with the suspension webs, and releasable means for connecting the coupling parts exteriorly upon the container in definitely fixed and definitely faced relation whereby the said coupling parts may be attached with facility to complementary coupling part of a harness without the necessity of direct fumbling with the coupling parts, said releasable means being actuated when the suspension webs are pulled taut to release the coupling parts from their definitely faced connection with the pack.

3. In an emergency attachable parachute pack the combination of a container, a parachute canopy, suspension means connected with the canopy, a plurality of coupling parts connected with the suspension means and disposed exteriorly of the container when the parachute canopy is packed in the container, and means exteriorly of the container connecting said coupling parts together so that load shock upon one will be distributed to the other.

4. In an emergency attachable parachute pack, the combination of a container, a parachute canopy, suspension means connected with the canopy, a plurality of coupling parts connected with the suspension means and disposed exteriorly of the container when the parachute canopy is packed in the container, means exteriorly of the container connecting said coupling parts together so that load shock upon one will be distributed to the other, and means connected with the container and said last mentioned means to prevent loss of the container upon opening of the parachute pack during a jump.

5. In parachute apparatus, the combination of a pack including a container, a parachute canopy therein, suspension means connected with the canopy, a coupling snap hook connected with the suspension means, the container being formed to permit the snap hook to extend exteriorly of the container when the latter is packed and closed, fastener means for releasably connecting the snap hook exteriorly upon the container in a definitely faced relation for facile attachment of the pack thereby to the body of a wearer without the necessity of fumbling with the snap hook to effect the attachment, and means attached to the suspension means for releasing said fastener during a parachute drop when the suspension means is pulled taut.

6. In parachute apparatus, the combination of a parachute harness including body straps and a coupling ring affixed to a body strap in definitely faced firmly held relation, a parachute pack including a container, a parachute therein, suspension means connected with the parachute, a coupling snap hook connected with the suspension means and disposed exteriorly of the container when the latter is packed, and releasable fastening means for holding said snap hook in definitely faced non-wobbling relation exteriorly upon the container whereby a wearer may grasp the pack and due to the definitely faced relation of the ring upon the harness and the snap hook upon the pack relatively attach said parts together without the necessity of directly fumbling therewith.

7. The combination with a harness in a parachute pack including a container, of a pair of spaced lift webs having means for suspending the same from the harness, said lift webs located adjacent to the bottom of the container and having portions extending into the container and exterior thereof, the interior portions being connected with a parachute and the exterior portions having terminal couplings, and means releasably connecting the coupling part with the bottom of the container for supporting the said couplings in fixed non-wobbling relation thereon for releasable connection with complementary couplings of a harness without the necessity of fumbling with the couplings.

8. Parachute apparatus comprising a parachute harness having a coupling part permanently fixed upon the front of the harness in a definite outstanding relation thereupon, a parachute pack including a container, a canopy, suspension means connected with the canopy adapted to be packed with the canopy in the container, means for releasably closing the container, a coupling part connected with the suspension means adapted to be positioned exteriorly of the container when the pack is closed, and means releasably connecting the last mentioned coupling part in position upon the container for facile attachment with the coupling part of the harness, said means being releasable upon opening of the container and deployment of the parachute.

9. Parachute apparatus comprising a pack having a container with an eye opening therein, means for releasably closing the container, a canopy adapted to be packed in the container, suspension means connected with the canopy and adapted to be packed in the container, a coupling connected with the suspension means and releasably extending exteriorly of the container and having a portion extensible from exteriorly of the container through the eye opening of the container into the container, and releasable means connected with the suspension means having releasable connection with the said portion of the coupling which extends into the container for releasably holding the coupling in a definite position exteriorly on the container for facile attachment with a complementary coupling upon a parachute harness.

10. In an emergency attachable parachute pack the combination of a container, a parachute canopy, suspension means connected with the canopy, a coupling part connected with the suspension means, a second coupling part connected with the suspension means, said suspension means adapted to releasably extend exteriorly of the container to position the said coupling parts exteriorly of the container, a cross suspension member connecting said coupling parts together externally of the container, and means for releasably holding the said coupling parts in definite non-wobbling position externally upon the container.

11. A parachute pack comprising a container, a parachute canopy, suspension means connected with the canopy and having a rigid coupling part connected therewith, and means for releasably connecting said rigid coupling part to the container in exterior definitely fixed and definitely faced non-wobbling association therewith for facile emergency attachment to a wearer, said means being connected with the suspension means so as to be actuated by a load pull incident to opening of the parachute for releasing the rigid coupling part from its connection with the container.

12. In parachute apparatus the combination of a parachute harness comprising body encasing straps, a detachable emergency parachute pack, and coupling parts on said harness and pack, one of said parts being a snap fastener and the other part a coupling ring, both of said coupling parts being secured in definite outstanding relation on said harness and pack to facilitate attachment of the pack to the harness without fumbling with the coupling parts, the coupling part on the harness being permanently affixed thereon at the normal front of the harness below the normal shoulder line to provide thereat a load suspension point.

13. In parachute apparatus the combination of a harness, an emergency attachable pack for the harness including a container, a parachute canopy, and load suspension means connected with the canopy, definitely faced non-wobbling coupling means on the harness, pack coupling means connected with the suspension means, and means for releasably connecting the pack coupling means externally on the container in definitely faced non-wobbling relation whereby an operator may grasp the pack and relatively affix the pack coupling means to the harness coupling means in secured relation without the necessity of directly fumbling with the coupling means, said pack coupling means due to its releasable connection with the container permitting the said coupling means to be directly disconnected from its non-wobbling position upon the container for a parachute descent.

14. Parachute apparatus comprising a harness constructed from webbing including a swing seat having side riser portions, a permanently affixed suspension coupling connected to each of said side riser portions above the waist of the wearer and below the shoulders of the wearer and in a non-wobbling position thereon, and an emergency pack having definitely positioned non-wobbling suspension couplings thereon for releasable coupling with the couplings of said harness, the coupling parts of the harness and pack being positioned in said non-wobbling relation whereby an operator may grasp the pack and relatively affix the pack couplings to the harness couplings in secured relation without the necessity of directly fumbling with said couplings, and the couplings of the harness being permanently affixed in the aforesaid location whereby the parachute will suspend the wearer from points located as aforesaid between the waist of the wearer and the shoulders of the wearer.

15. In a parachute pack the combination of a container, means for releasably holding the container closed, a parachute canopy adapted to be packed in the container, suspension means connected with the canopy and also adapted to be packed in the container, a coupling part connected with the suspension means and adapted to lie externally of the container when the latter is packed and closed, and means releasably connecting the coupling part to the container and exteriorly thereon in a definitely fixed non-wobbling association, whereby an operator may attach the coupling part of the pack to a complementary part upon a harness or load without the necessity of fumbling directly with the coupling parts, said means which releasably connects the coupling part to the container being actuable to release the coupling part from the container upon opening of the container and during a parachute drop.

FLOYD SMITH.